(12) United States Patent
Kim

(10) Patent No.: US 7,394,186 B2
(45) Date of Patent: Jul. 1, 2008

(54) DISPLAY APPARATUS

(75) Inventor: Sok-San Kim, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 510 days.

(21) Appl. No.: 11/190,238

(22) Filed: Jul. 27, 2005

(65) Prior Publication Data

US 2006/0044745 A1    Mar. 2, 2006

(30) Foreign Application Priority Data

Aug. 28, 2004    (KR) .................. 10-2004-0068306

(51) Int. Cl.
*H01J 17/49* (2006.01)
*G09G 3/10* (2006.01)

(52) U.S. Cl. .................. 313/46; 313/582; 313/634; 315/169.3; 315/169.1; 361/681

(58) Field of Classification Search .................. 361/681
See application file for complete search history.

(56) References Cited

U.S. PATENT DOCUMENTS

| | | | | |
|---|---|---|---|---|
| 6,151,207 A * | 11/2000 | Kim | ........................... | 361/681 |
| 6,411,501 B1 * | 6/2002 | Cho et al. | ..................... | 361/681 |
| 6,494,429 B2 * | 12/2002 | Tajima | ........................ | 248/473 |
| 6,501,642 B2 * | 12/2002 | Kim | ........................... | 361/681 |
| 6,512,558 B2 * | 1/2003 | Kim | ........................... | 349/58 |
| 6,532,152 B1 * | 3/2003 | White et al. | ................. | 361/692 |
| 6,560,124 B1 * | 5/2003 | Irie et al. | .................... | 361/816 |
| 6,688,576 B2 * | 2/2004 | Oishi et al. | .................. | 248/317 |
| 6,808,148 B1 * | 10/2004 | Eakle et al. | ............... | 248/309.1 |
| 6,813,159 B2 * | 11/2004 | Irie et al. | ..................... | 361/752 |
| 6,859,357 B2 * | 2/2005 | Morimoto et al. | ........... | 361/681 |
| 6,882,108 B2 * | 4/2005 | Kim et al. | .................... | 313/582 |
| 7,038,360 B2 * | 5/2006 | Bae et al. | ....................... | 313/46 |
| 7,061,177 B2 * | 6/2006 | Kang et al. | .................. | 313/582 |
| 7,075,241 B2 * | 7/2006 | Kim et al. | ................. | 315/169.3 |
| 7,091,665 B2 * | 8/2006 | Nomoto et al. | ............. | 313/583 |
| 7,164,586 B2 * | 1/2007 | Lin | .............................. | 361/714 |
| 7,269,009 B2 * | 9/2007 | Ryu et al. | .................... | 361/692 |

* cited by examiner

*Primary Examiner*—Lisa Lea-Edmonds
(74) *Attorney, Agent, or Firm*—Knobbe Martens Olson & Bear LLP

(57) ABSTRACT

A display apparatus is provided. The display apparatus is an assembly of a display panel, a chassis, a circuit board and a board connection member. During operation, the display panel produces an image. The chassis includes a base supporting the display panel at the rear of the display panel, and a first protrusion protruding from the base in a direction away from the display panel. The circuit board is fixed at a position that is spaced apart from a rear surface of the chassis by a given gap and functions to electronically drive the display panel. The board connection member includes a chassis fixing portion, a board fixing portion and a connection supporter. The chassis fixing portion is connected to the first protrusion, the board fixing portion is connected to the circuit board, and the connection supporter is arranged between the circuit board and the chassis and connects the chassis fixing portion and the board fixing portion. Thus, the board connection members are used to fix the circuit board to the chassis during assembly.

11 Claims, 7 Drawing Sheets

DISPLAY APPARATUS

CROSS-REFERENCE TO RELATED PATENT APPLICATION

This application claims the benefit of Korean Patent Application No. 10-2004-0068306, filed on Aug. 28, 2004, in the Korean Intellectual Property Office, the disclosure of which is incorporated herein in its entirety by reference.

BACKGROUND OF THE INVENTION

1. Field of the Invention

Certain inventive aspects relate to a display apparatus, and more particularly, to a display apparatus including a display panel for producing an image, a chassis arranged at the rear of the display panel to thereby support the display panel, and circuit boards arranged spaced apart from the chassis by a predetermined gap and connected to the display panel.

2. Description of the Related Technology

FIG. 1 is an exploded perspective view illustrating a structure by which a circuit board is connected and fixed to a chassis in a conventional plasma display apparatus.

Referring to FIG. 1, a plasma display apparatus 10 includes a display panel 20, a chassis 40 and circuit boards 50. The display panel 20 produces an image, and the chassis 40 is arranged at the rear of the display panel 20 and supports the display panel 20.

The circuit boards 50 are arranged at the rear of the chassis 40, and drive the display panel 20. A connection cable is connected between the circuit boards 50, and and the display panel 20.

Semiconductor devices are installed on the circuit board 50. In this case, pins on the semiconductor device protrude from the rear side of the circuit board 50 through the board and out the front side. In order to prevent such pins from contacting the rear surface of the chassis 40, thereby causing an electrical short, the circuit board 50 must be spaced apart from the chassis 40 by a predetermined gap.

Accordingly, bosses 89 of a predetermined height are formed on the chassis 40, and holes 50h are formed at portions of the circuit board 50 corresponding to the bosses 89. When the circuit board 50 is fixed to the chassis 40, screws 99 are inserted through the holes 50h of the circuit board 50 into the bosses 89, whereby a gap corresponding to the height of the boss 89 is formed between the chassis 40 and the circuit board 50.

In order to fix the circuit board 50 to the chassis 40, the screws 99 should be fixed to the bosses 89 by their rotation after passing through the holes 50h. However, such a screwing task requires quite a bit of time, and the circuit board 50 may be damaged by mistakes made during the task. Moreover, when many screws 99 are needed for the circuit board 50 to be able to endure vibration/drop tests, the screwing task requires much more time, whereby the manufacturing cost for the plasma display apparatus is greatly increased. In addition, the chassis 40 is generally manufactured through a press mold or a casting mold. In this case, an additional process and cost is required to form the bosses 89 in such a mold.

Generally, the chassis 40 is made of metal so as to support the display panel 20 and to function as a heat exhaust plate. Recently, the chassis 40 has been made of aluminum so as to reduce the weight of the plasma display apparatus and to increase the heat exhaustion properties thereof. However, a chassis 40 made of aluminum tends to flex because it has a relatively large surface area in comparison to its thickness.

Accordingly, so as to increase the rigidity of the chassis 40, a reinforcement member 45 is formed on a rear surface of the chassis 40. However, the reinforcement member 45 needs an additional fixing process. Also, the reinforcement member 45 increases the thickness of the chassis 40 and consequently increases the total thickness of the plasma display apparatus.

The circuit boards 50 may need to be arranged spaced apart from the rear surface of the chassis 40 by different gaps according to heat generation values of devices mounted thereon. In this case, the bosses 89 used for the circuit boards 50 should have different heights according to the corresponding circuit boards 50. Specifically, when the bosses 89 are separately manufactured and then fixed to the rear surface of the chassis 40, the manufacturing process of the plasma display apparatus becomes more complex, and consequently the manufacturing time and cost is undesirably increased.

SUMMARY OF CERTAIN INVENTIVE ASPECTS

Certain inventive aspects provide a display apparatus having a structure by which a chassis can have sufficient rigidity and circuit boards can be simply and rapidly fixed to the chassis.

Certain inventive aspects also provide a display apparatus having a structure by which the heights of bosses and board connection members can be standardized according to the required gaps between the chassis and the circuit boards.

The aspects further provide a display apparatus having a structure by which a noise caused by the vibration of the circuit boards can be prevented or considerably reduced.

According to an aspect, there is provided a display apparatus includes a display panel, a chassis, at least one circuit board and a board connection member.

The display panel produces an image. The chassis includes a base for supporting the display panel at the rear of the display panel, and a first protrusion protruding from the base in a direction away from the display panel.

The circuit board is fixed to be spaced apart from a rear surface of the chassis by a given gap and is electrically connected to the display panel.

The circuit board is fixed to the chassis by the board connection member. The board connection member includes a chassis fixing portion, a board fixing portion and a connection supporter. The chassis fixing portion is connected to the first protrusion, the board fixing portion is connected to the circuit board, and the connection supporter is arranged between the circuit board and the chassis and connects the chassis fixing portion and the board fixing portion.

The circuit board may include a board fixing hole formed at a position corresponding to the board fixing portion. The board fixing portion may include: an elastic board through portion whose diameter is larger than that of the board fixing hole, the elastic board through portion passing through the board fixing hole and being positioned at a rear side of the circuit board; a board insertion portion inserted into the board fixing hole; and a board supporting portion whose diameter is larger than that of the board fixing hole, the board supporting portion being connected to the connection supporter to support a front side of the circuit board.

The display panel may be a plasma display panel producing an image through plasma discharge.

BRIEF DESCRIPTION OF THE DRAWINGS

The above and other features and advantages of the present invention are discussed with further detailed exemplary embodiments with reference to the attached drawings in which.

DETAILED DESCRIPTION OF CERTAIN INVENTIVE EMBODIMENTS

Certain inventive embodiments will now be described more fully with reference to the accompanying drawings.

Figure 2:
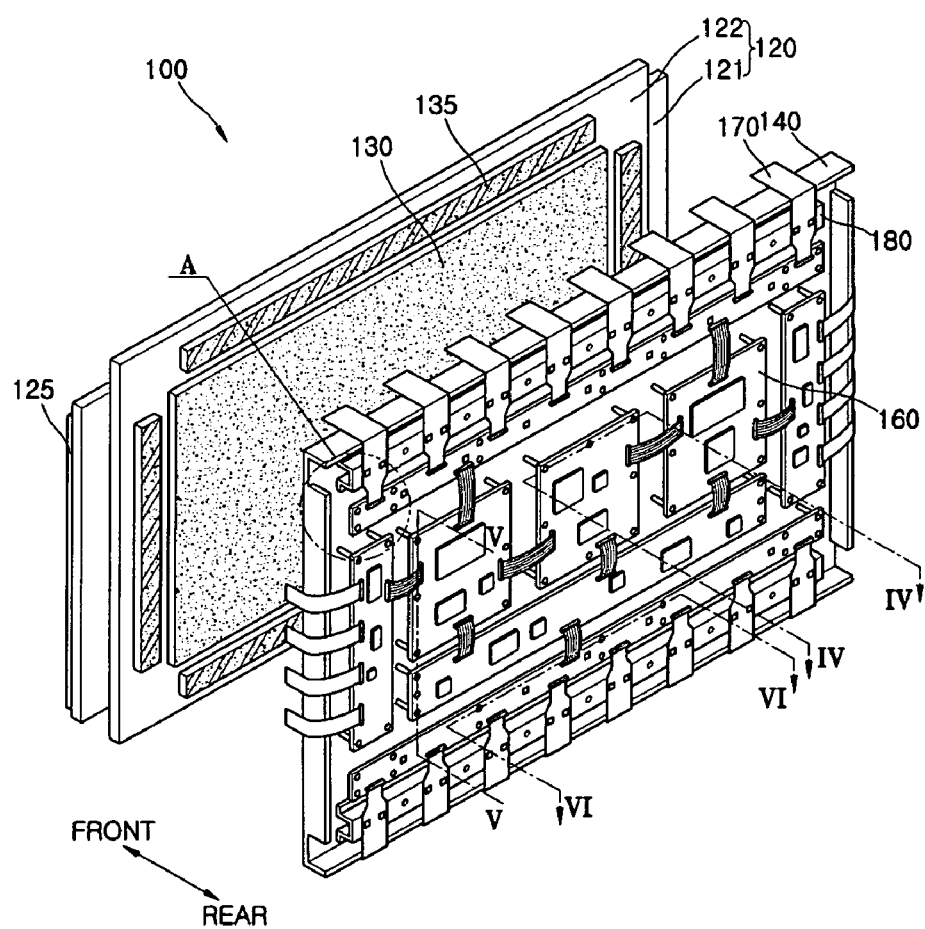
FIG. 2 is an exploded perspective view of a display apparatus according to an embodiment.

FIG. 2 is an exploded perspective view of a display apparatus according to an embodiment. Although an inventive display apparatus 100 is illustrated as a plasma display apparatus in FIG. 2, the display apparatus 100 is not limited to the plasma display apparatus, but may be any display apparatus in which a display panel 120 is supported by a chassis 140 and a circuit board 160 is arranged spaced apart from the chassis 140 by a predetermined gap.

Referring to FIG. 2, the display apparatus 100 includes a display panel 120, a chassis 140 supporting the display panel 120, and at least one circuit board 160 installed at the rear of the chassis 140.

The display panel 120 may be any one of various display panels, generally being a flat panel display. For example, the display panel 120 may be a plasma display panel (PDP) that is equipped with front and rear panels 121 and 122 facing each other and produces an image by plasma discharge. The display panel 120 may also be an organic light emitting diode display (OLED), a liquid crystal display (LCD), or a field emission display (FED). Other types of displays may also be used.

In some embodiements the display panel 120 is a surface discharge AC (alternating current) PDP, and may include a front panel 121 and a rear panel 122. In this case, although not shown in the FIG. 2, the display may comprise a front substrate, a plurality of sustain electrode pairs formed on the front substrate, a front dielectric layer burying the sustain electrode pairs, a protective layer covering the front dielectric layer, a rear substrate, a plurality of address electrodes formed on the rear substrate to intersect the sustain electrode pairs, a rear dielectric layer burying the address electrodes, barrier ribs formed between the front and rear dielectric layers to thereby limit a discharge space and prevent a crosstalk, and RGB phosphor layers arranged in the discharge space and formed to be able to produce color.

A filter 125 may be installed at the rear side of the display panel 120. The filter 125 includes an electromagnetic wave shielding layer for shielding a person from electromagnetic waves generated when the display panel 120 is driven.

The chassis 140 may be arranged at the rear of the display panel 120. The chassis 140 supports the display panel 120, and receives heat from the display panel 120 to then exhaust the heat from the plasma display apparatus 100 to the outside.

The display panel 120 and the chassis 140 may be connected to each other with adhesive members 135 such as double sided tapes. A heat transfer sheet 130 may be provided between the display panel 120 and the chassis 140 to exhaust heat generated at the display panel 120 via the chassis 140 to the outside.

At least one circuit board 160 is installed at the rear of the chassis 140 connected to the display panel 120. The circuit boards 160 are equipped with devices for driving the display panel 120. The display panel driving devices include a device for supplying power to the display panel 120, and a device for applying a signal for producing an image to the display panel 120. The circuit board 160 and the electrodes of the display panel 120 are electrically connected by a signal-transmitting member 170. In this case, a seat member 180 for the signal-transmitting member 170 may be formed on the chassis 140.

The display panel 120 and the chassis 140 may be installed in a case (not shown).

Figure 3:
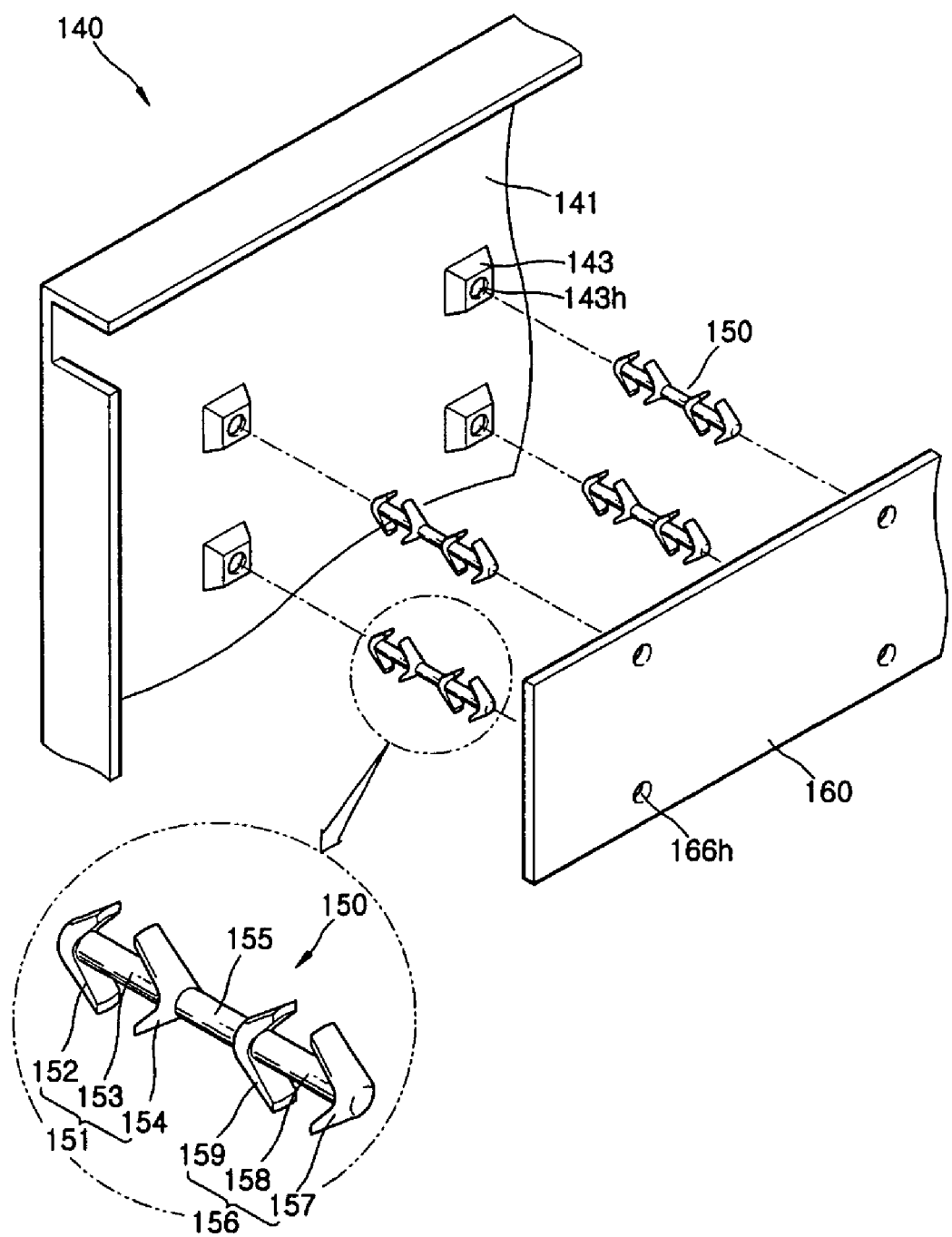
FIG. 3 is an enlarged exploded perspective view of a portion "A" of the chassis shown in FIG. 2.

FIG. 3 is an enlarged exploded perspective view of a portion "A" of the chassis shown in FIG. 2.

Referring to FIGS. 2 and 3, the chassis 140 includes a base 141 and a first protrusion 143. The base 141 supports the display panel 120 positioned at the front thereof. The base 141 is generally flat and may have a bent edge so as to increase its rigidity. The first protrusion 143 may protrude from the base 141 toward the rear side, and may be embossing-shaped or bid-shaped. The first protrusion 143 and the circuit board 160 are connected by board connection members 150. The board connection member 150 includes a chassis fixing portion 151, a board fixing portion 156 and a connection supporter 155. The chassis fixing portion 151 is connected to the first protrusion 143, the board fixing portion 156 is connected to the circuit board 160, and the fixing portions 151 and 156 are connected by the connection supporter 155. That is, the board connection member 150 may be a spacer that is arranged between the circuit board 160 and the first protrusion 143 connecting the circuit board 160 to the chassis 140.

Figure 1:
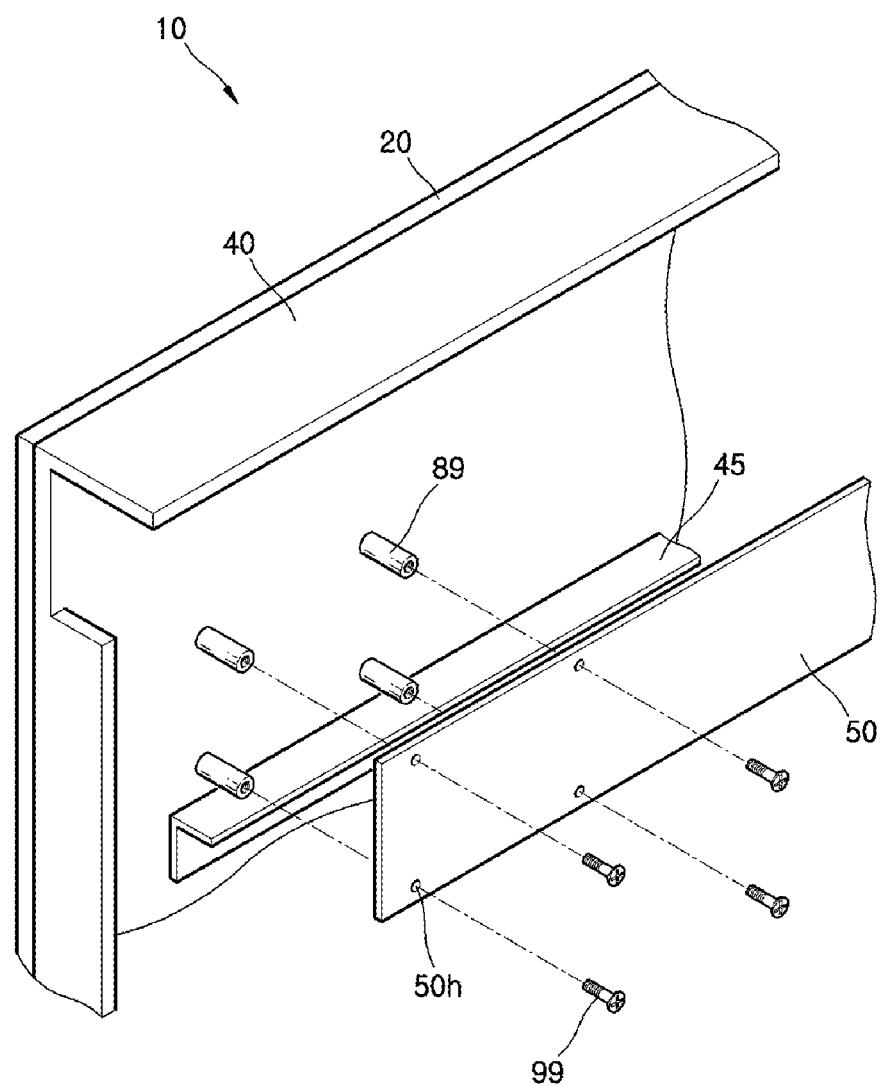
FIG. 1 is an exploded perspective view illustrating a structure by which a circuit board is connected and fixed to a chassis in a display apparatus.

Unlike the conventional circuit board connection technique shown in FIG. 1, the circuit board 160 and the chassis 140 in some embodiments are connected by the protrusions 143 and the board connection members 150. Such embodiments do not require a task for inserting the screws 99 into the holes 50h and the bosses 89 and rotating the screws 99 for fixing, as shown in FIG. 1. Accordingly, the circuit board connection process is simpler and less time-consuming than the conventional circuit board connection process. Moreover, the first protrusion 143 may be bid or embossing shaped and may function as a reinforcement member to thereby increase the rigidity of the chassis 140.

In order to simply connect the first protrusion 143 and the circuit board 160 by the board connection members 150, board fixing holes 166h may be formed at portions of the circuit board 160 corresponding to the board fixing portions 156. Accordingly, the board fixing portions 156 may be inserted into the corresponding board fixing holes 166h.

Figure 4:
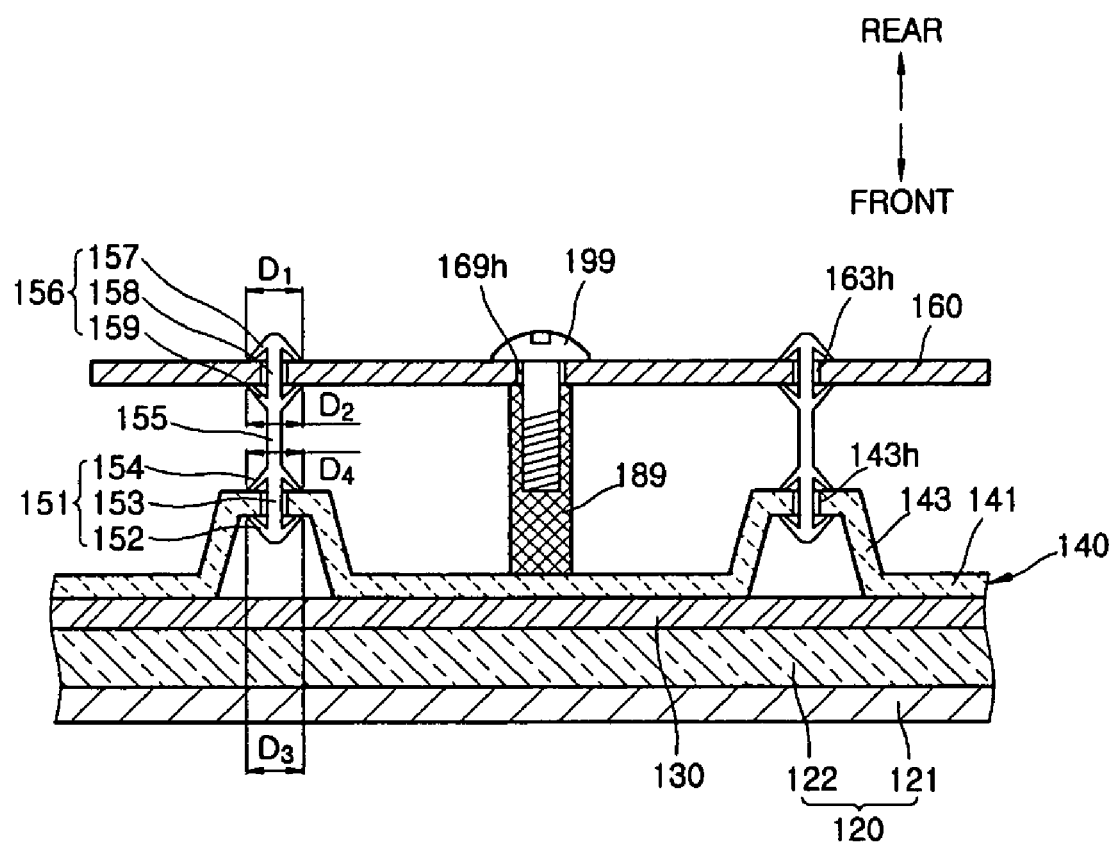
FIG. 4 is a cross-sectional view illustrating a portion of the display apparatus taken along line IV-IV in FIG. 2.

FIG. 4 is a cross-sectional view illustrating a side of the display apparatus taken along line IV-IV in FIG. 2.

Referring to FIGS. 3 and 4, the board fixing portion 156 may include a board through portion 157, a board insertion portion 158 and a board supporting portion 159. The board through portion 157 passes through the board fixing hole 166h and is positioned at the rear side of the circuit board 160. The board through portion 157 is at least partly elastic, and has a diameter "D1" larger than that of the board fixing hole 166h. Accordingly, the board through portion 157 can pass through the board fixing hole 166h from the front to the rear, and then can return to its original state, whereby the board through portion 157 is held to the board fixing hole 166h.

The board insertion portion 158 is inserted into the board fixing hole 166h.

The board supporter 159 is formed to have a diameter "D2" larger than that of the board fixing hole 166h, supports the rear side of the circuit board 160, and is connected to the connection supporter 155, whereby the board fixing hole 166h positioned between the board supporter 159 and the board through portion 157 is securely fixed.

Therefore, when the circuit board 160 is pressed against the board fixing portions 156, the elastic board through portion 157 passes through the board fixing holes 166h, and the board supporter 159 supports the rear side of the circuit board 160 to thereby fix the circuit board 160. Accordingly, the circuit board 160 and the board connection member 150 can be simply and securely connected.

Similarly, chassis fixing holes 143h are preferably formed at portions of the protrusions 143 corresponding to the chassis fixing portions 151 and the chassis fixing portions 151 may be inserted into the corresponding chassis fixing holes 143h.

Referring to FIG. 4, the chassis fixing portion 151 may include a chassis through portion 152, a chassis insertion portion 153 and a chassis supporter 154. The chassis through portion 152 passes through the chassis fixing hole 143h and is positioned at the rear side of the first protrusion 143. The chassis through portion 152 is at least partly elastic, and has a diameter "D3" larger than that of the chassis fixing hole 143h. Accordingly, the chassis through portion 152 can pass through the chassis fixing hole 143h from the rear to the front, and then can return to its original state, whereby the chassis through portion 152 is held to the chassis fixing hole 143h.

The chassis insertion portion 153 may be inserted into the first protrusion 143 through the chassis fixing hole 143h.

The chassis supporter 154 may be formed to have a diameter "D4" larger than that of the chassis fixing hole 143h, may support the rear side of the chassis 140 (specifically, the first protrusion 143), and may be connected to the connection supporter 155, whereby the chassis fixing hole 143h positioned between the chassis supporter 154 and the chassis through portion 152 is securely fixed.

As above, the chassis fixing portion 151 can be arranged to be inserted into the chassis fixing hole 143h of the first protrusion 143 to thereby fix the chassis 140 simply and securely, Also, the board fixing portion 156 can be arranged to be inserted into the board fixing hole 166h to thereby fix the circuit board 160 simply and securely. Accordingly, the circuit board 160 can be fixed without using additional board fixing members, such as the bosses 89 and the screws 99 shown in FIG. 1.

In this case, the board connection member 150 may be a plastic spacer formed in such a way that the chassis fixing portion 151, the connection supporter 155 and the board fixing portion 156 are formed in one body.

Figure 5:
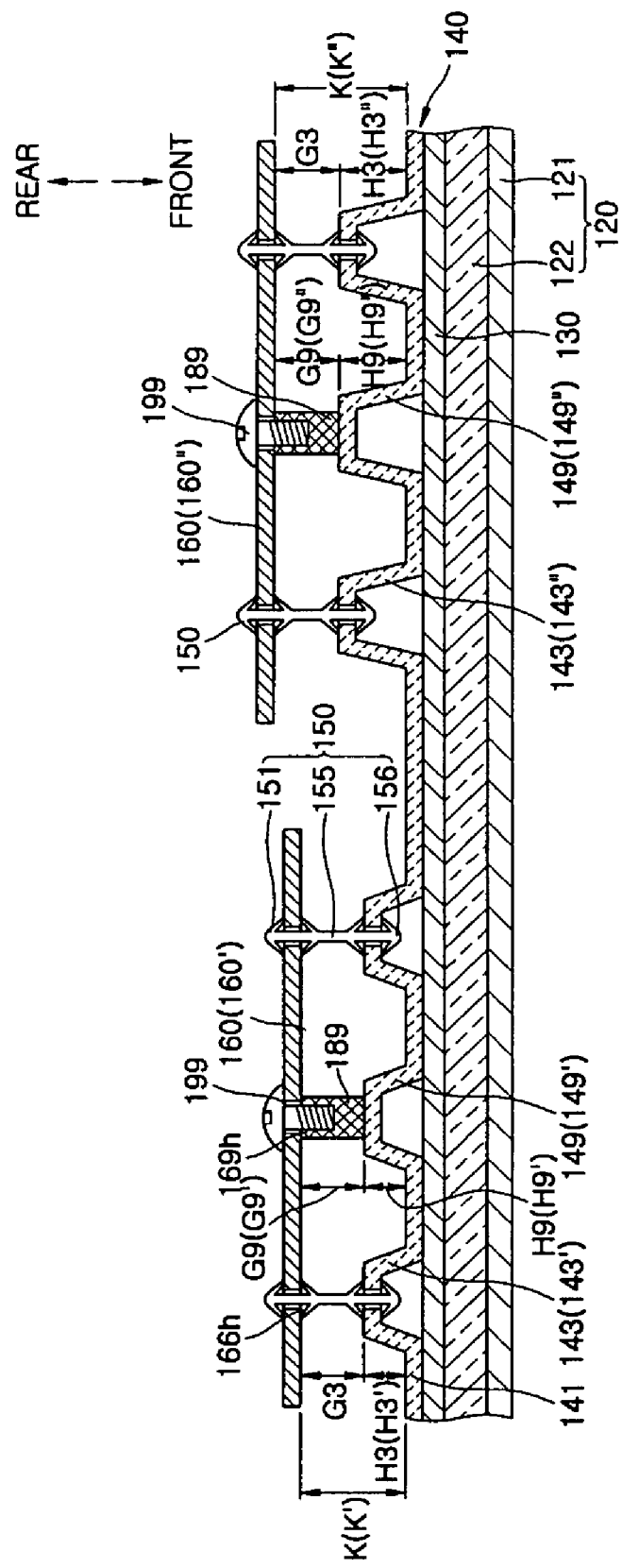
FIG. 5 is a cross-sectional view illustrating a portion of the display apparatus taken along line V-V in FIG. 2.

FIG. 5 is a cross-sectional view illustrating a side of the display apparatus taken along line V-V in FIG. 2.

Contemplated embodiments are not limited to a structure in which the circuit board 150 is connected and fixed to the chassis 140 only by the board connection members 150. That is, as shown in FIG. 5, one or more bosses 189 are also formed on a rear surface of the chassis 140 corresponding to the circuit board 160. Boss connection holes 169h are formed in the circuit board 160 at the rear of the bosses 189, and the circuit board 160 can be connected to the chassis 140 by boss fixing members 199 (for example, screws) that passes through the boss connection holes 169h from the rear of the bosses 189 and are then fixed to the bosses 189. That is, the circuit board 160 can be connected and fixed to the chassis 140 by the bosses 189 and the boss fixing members 199 as well as the board connection members 150.

A second protrusion 149 of an embossing or bid shape is formed at a portion of the rear surface of the chassis 140 at which the boss 189 is formed, and the boss 189 is formed on the second protrusion 149, whereby the rigidity of the chassis 140 can be further improved by the second protrusion 149.

A gap K identical to or larger than a given value must exist between the base 141 and the circuit board 160 so as to prevent an electrical short therebetween.

However, the gaps K between the base 141 and the respective circuit boards 160 may be different from one another according to heat generation values of devices mounted on the respective circuit boards 160. In this case, the second protrusions 149 may be formed to have heights H9 proportional to the gaps K between the base 141 and the respective circuit boards 160.

That is, referring to FIG. 5, in some embodiments, when a gap K" between a right circuit board 160" and the base 141 must be larger than a gap K' between a left circuit board 160' and the base 141, a height H9" of a second protrusion 149" corresponding to the right circuit board 160" may be formed to have a larger value than a height H9' of a second protrusion 149' corresponding to the left circuit board 160'. At this time, it is preferable that a gap G9' between the left circuit board 160' and the second protrusion 149' is substantially identical to a gap G9" between the right circuit board 160" and the second protrusion 149".

Accordingly, the gaps G between all the second protrusions 149 and all the corresponding circuit boards 160 can become substantially identical to one another, whereby the heights G9 of the bosses 189 for fixing the circuit boards 160 respectively to the second protrusions 149 can be standardized and the related task time can be reduced.

Similarly, it is preferable that the first protrusions 143 are also formed to have heights H3 related to the gaps "K" between the base 141 and the respective circuit boards 160. That is, when the gap K" between the right circuit board 160" and the base 141 must be larger than the gap K' between the left circuit board 160' and the base 141, a height H3" of a first protrusion 143" corresponding to the right circuit board 160" is preferably formed to have a larger value than a height H3' of a first protrusion 143' corresponding to the left circuit board 160'. Accordingly, a gap G3 between the left circuit board 160' and the first protrusion 143' may be substantially identical to a gap G3 between the right circuit board 160" and the first protrusion 143".

Accordingly, the gaps G between all the first protrusions 149 and all the corresponding circuit boards 160 can become substantially identical to one another, whereby the heights (G9) of the board connection members 150 can be standardized and consequently the related manufacturing time and coast can be reduced.

Figure 6:
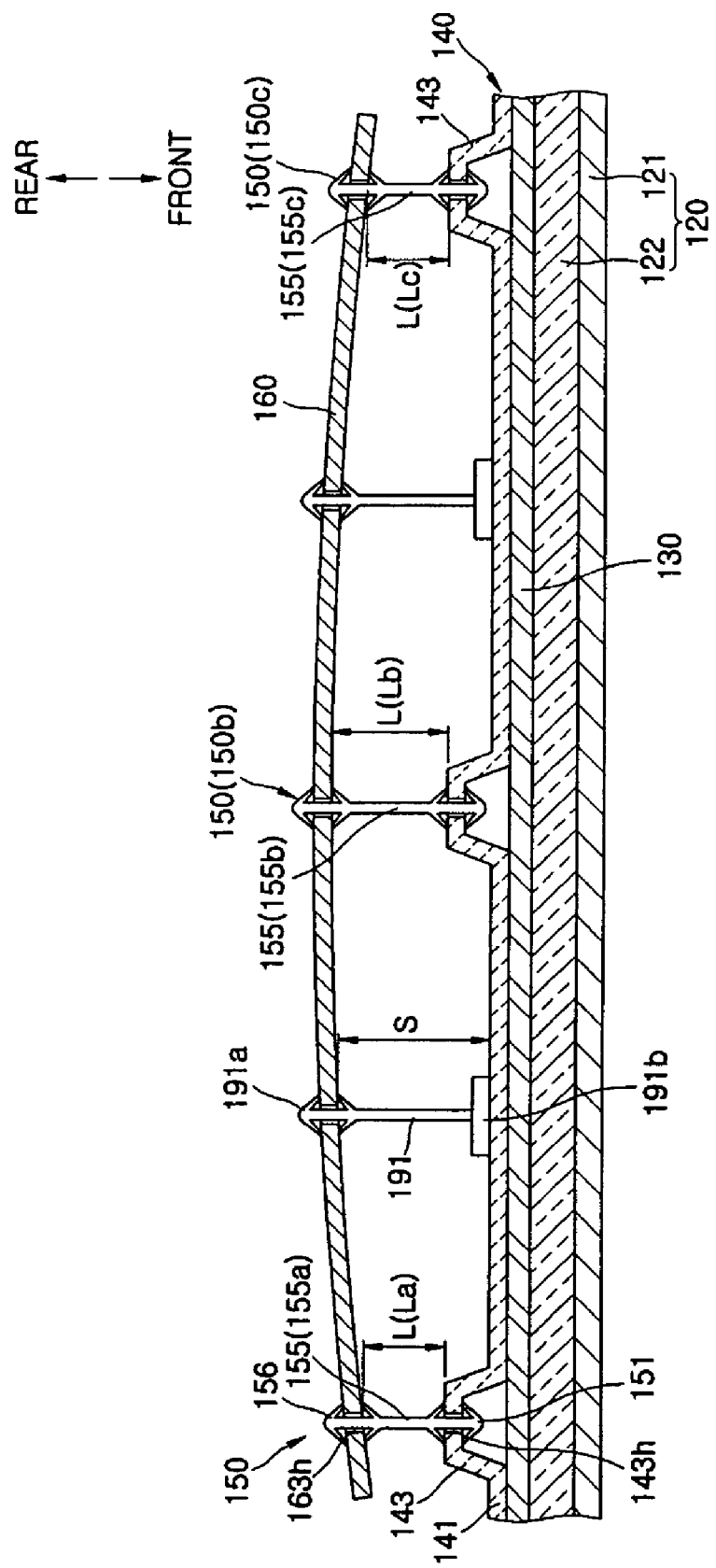
FIG. 6 is a cross-sectional view illustrating a portion of the display apparatus taken along line VI-VI in FIG. 2.

FIG. 6 is a cross-sectional view illustrating a side of the display apparatus taken along line VI-VI in FIG. 2.

As shown in FIG. 6, heights L (La, Lb, and Lc) of at least one or more board connection supporters 155 are preferably different from heights of the other connection supporters 155.

For example, heights Lb of a connection supporter 155b (of a board connection member 150b fixed to a center portion of a circuit board 160) may be larger than heights La and Lc of connection supporters 155a and 155c (of board connection members 150a and 150c fixed to both end portions of the circuit board 160). Accordingly, the circuit board 160 may be bent in a direction away from the display panel 120 to thereby be fixed to the chassis 140. Consequently, the circuit board 160 is not apt to be vibrated by external vibrations, whereby noise that may be caused by the vibration of the circuit board 160 due to the external vibrations can be reduced.

Figure 7:
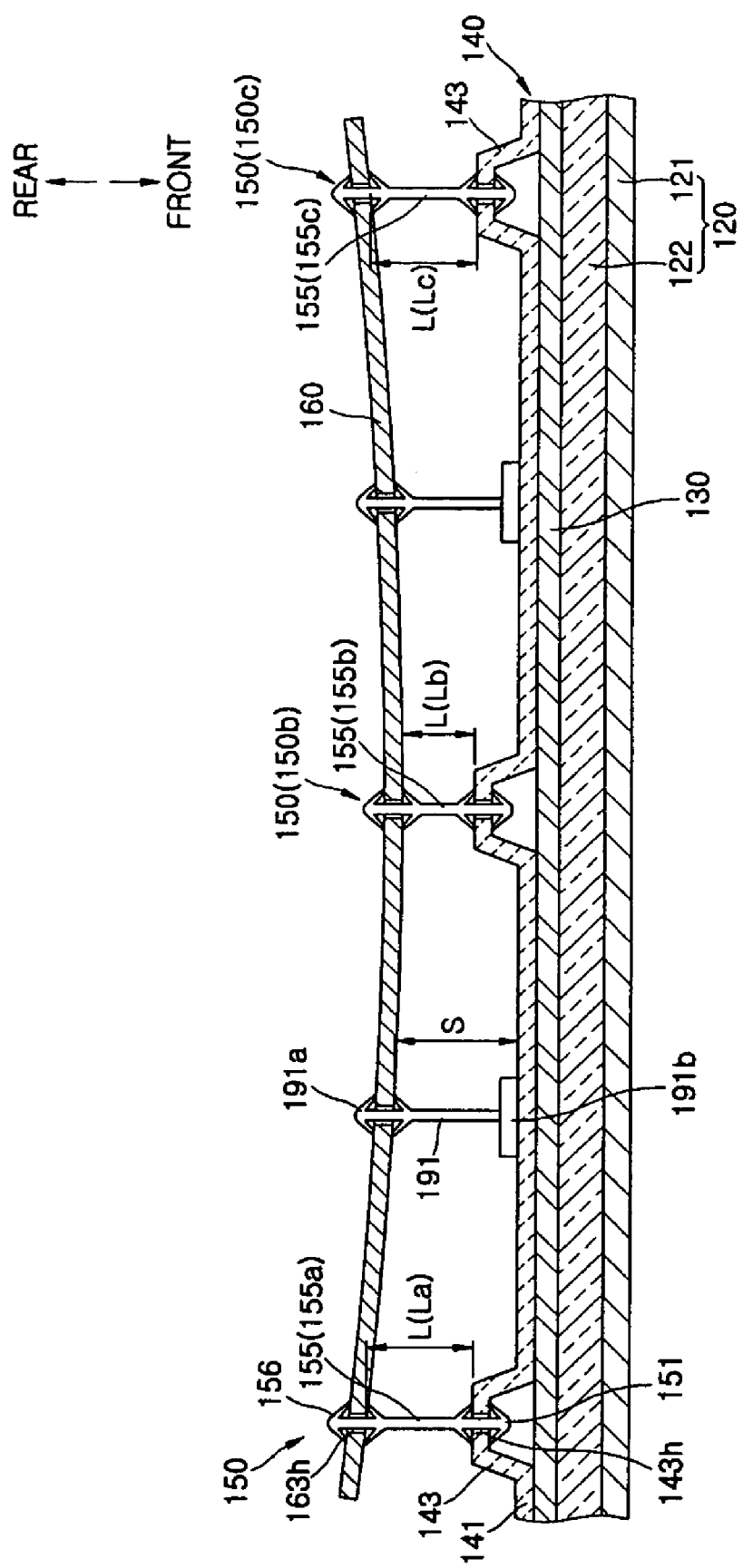
FIG. 7 is a cross-sectional view illustrating a modification of the portion shown in FIG. 6.

FIG. 7 is a cross-sectional view illustrating a modification of FIG. 6.

As shown in FIG. 7, unlike the structure shown in FIG. 6, heights Lb of a connection supporter 155b (of a board connection member 150b fixed to a center portion of a circuit board 160) may be smaller than heights La and Lc of connection supporters 155a and 155c (of board connection members 150a and 150c fixed to both end portions of the circuit board 160). Accordingly, the circuit board 160 may be bent toward the chassis 40 to thereby be fixed to the chassis 140. Consequently, the circuit board 160 is not apt to be vibrated by external vibrations, whereby noise that may be caused by the vibration of the circuit board 160 due to the external vibrations can be reduced.

As shown in FIGS. 6 and 7, the heights of the connection supporters 155 can be adjusted so that the circuit board 160 can be entirely bent. However, embodiments other than the structures shown in FIGS. 6 and 7 are possible. Such embodiments may include, but are not limited to the heights of the connection supporters 155 being adjusted so that the circuit board 160 can be partially bent and partially strait, can have multiple bent portions, or can be bent in multiple directions.

Alternatively, in some embodiments supporters 191 supporting the circuit board 160 against the base 141 may be further arranged between the base 141 and the board 160 so as to securely fix the board 160 to the base 141. In these embodiments, heights S of the supporters 191 between the base 141 and the circuit board 160 may be different from heights L of the neighboring connection supporters. Accordingly, the circuit board 160 is bent toward the rear or front direction to thereby be securely fixed to the base 141. Consequently, the circuit board 160 is not apt to be vibrated by external vibrations, whereby noise that may be caused by the vibration of the circuit board 160 due to the external vibrations can be reduced.

In some embodiments, the supporter 191 may have a front end portion 191a with the same structure as that of the board through portion 157, and a flat rear end portion 191b fixed to the base 141. However, the supporter 191 is not limited to such a structure, and may be any structure by which the supporter 191 is arranged between the base 141 and the circuit board 160 to thereby support the circuit board 160.

As stated above, the display apparatus may not use the bosses 89 and the screws 99, so that the circuit boards can be simply and rapidly fixed to the chassis and consequently the related manufacturing cost can be considerably reduced.

Also, the heights of the second protrusions may be formed to be different from one another according to the required gaps between the chassis and the circuit boards, whereby the bosses and the board connection members can be standardized and consequently the related manufacturing time and coast can be considerably reduced.

Further, the circuit boards may be sufficiently bent and extended to thereby be securely fixed to the chassis, whereby noise that may be caused by the vibration of the circuit boards due to the external vibrations can be prevented or considerably reduced.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A display apparatus comprising:
a display panel configured to produce an image;
a chassis comprising a base configured to support the display panel at the rear of the display panel and comprising a first protrusion protruding from the base in a direction away from the display panel;
a circuit board fixed to be spaced apart from a rear surface of the chassis by a predetermined gap, and configured to control the display panel; and
a circuit board connection member comprising a chassis fixing portion connected to the first protrusion, a board fixing portion connected to the circuit board, and a connection supporter arranged between the circuit board and the chassis configured to connect the chassis fixing portion and the board fixing portion so as to fix the circuit board to the chassis.

2. The apparatus of claim 1, wherein:
the circuit board comprises a board fixing hole formed therein at a position corresponding to the board fixing portion; and
the board fixing portion comprises an elastic board through portion having a diameter larger than a diameter of the board fixing hole configured to pass through the board fixing hole to be at least in part positioned at a rear side of the circuit board, a board insertion portion inserted into the board fixing hole, and a board supporting portion having a diameter larger than the diameter of the board fixing hole and connected to the connection supporter to support a front side of the circuit board.

3. The apparatus of claim 2, wherein the first protrusion includes a chassis fixing hole formed at a position corresponding to the chassis fixing portion, and the chassis fixing portion comprises:
an elastic chassis through portion having a diameter larger than a diameter of the chassis fixing hole configured to pass through the chassis fixing hole to be at least partly positioned at a front side of the first protrusion;
a chassis insertion portion inserted into the chassis fixing hole; and
a chassis supporter having a diameter larger than the diameter of the chassis fixing hole, the chassis supporter being connected to the connection supporter to support the chassis.

4. The apparatus of claim 2, wherein the circuit board connection member is a plastic spacer comprising the chassis fixing portion, the connection supporter and the board fixing portion being integrally formed.

5. The apparatus of claim 1, wherein:
the rear surface of the chassis comprises one or more bosses;
the circuit board includes a boss connection hole formed therein at a rear of the boss connection, wherein the bosses and the boss connection hole are located at corresponding positions; and
the circuit board and the chassis are connected by a boss fixing member passing through the boss connection hole.

6. The apparatus of claim 5, wherein the chassis further comprises a second protrusion protruding from the base in a direction away from the display panel and being connected to one of the one or more bosses.

7. The apparatus of claim 6, wherein the second protrusion is formed to have a height related to a gap between the base and the circuit board at a rear of the second protrusion.

8. The apparatus of claim 1, wherein the first protrusion is formed to have a height related to a gap between the base and the circuit board at a rear of the first protrusion.

9. The apparatus of claim 1, wherein a plurality of board connection members are fixed to the circuit board, and the height of at least one connection supporter is different from the height of another connection supporter.

10. The apparatus of claim 1, further comprising a supporter arranged between the base and the circuit board to support the circuit board against the base, wherein a height of the supporter between the base and the circuit board is different from a height of the connection supporter.

11. The apparatus of claim 1, wherein the display panel is a plasma display panel configured to produce an image through plasma discharge.

* * * * *